Dec. 18, 1956  J. BONNER  2,774,589
CUTTING TORCH MACHINE HAVING REVOLVING TEMPLATE MOUNTS
Filed July 2, 1954  2 Sheets-Sheet 1
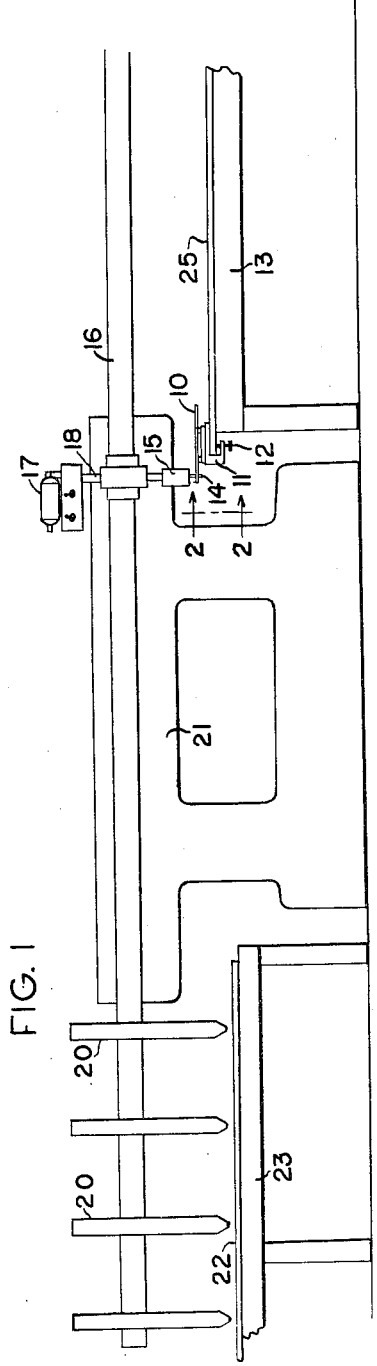
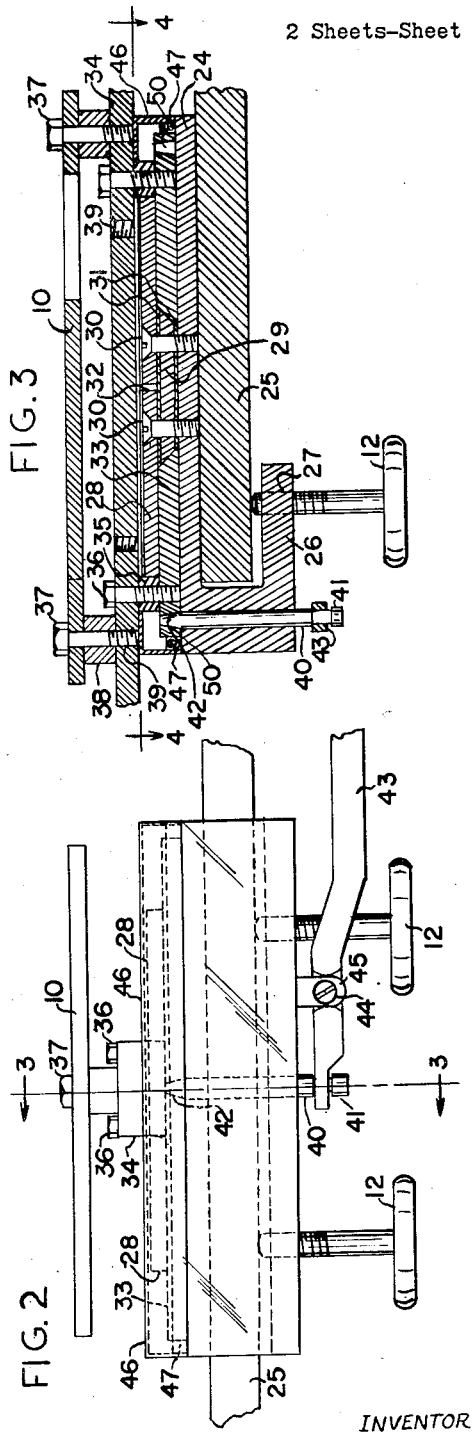
INVENTOR,
JOSEPH BONNER
By Adam E. Fisher
ATTORNEY Dec. 18, 1956  J. BONNER  2,774,589
CUTTING TORCH MACHINE HAVING REVOLVING TEMPLATE MOUNTS
Filed July 2, 1954  2 Sheets-Sheet 2

INVENTOR.
JOSEPH BONNER
BY Adam E. Fisher
ATTORNEY

2,774,589

CUTTING TORCH MACHINE HAVING REVOLVING TEMPLATE MOUNTS

Joseph Bonner, San Francisco, Calif.

Application July 2, 1954, Serial No. 441,090

4 Claims. (Cl. 266—23)

This invention relates to a mount for a template, said template to be used in conjunction with a tracing machine which operates a multiplicity of cutting torches and which torches cut out shapes corresponding to the template.

An object of this invention is to provide a mount for a template, said template to be used as a guide for cutting shapes out of metal by gas torch cutting or other means, whereby the position of the template may be readily turned to a specified angle usually either 90 degrees or 180 degress to permit the interlacing of the shapes cut out of the metal so as to obtain the maximum number of shapes from a given sheet of metal.

A further object of the invention is to provide means whereby said template mount may be securely locked in position with means to readily release said template mount and reposition it and lock it in a new position without the necessity of removing said template from its mount.

Another object of the invention is to provide means whereby said template mount may be detachably attached to a work table.

A preferred embodiment of this invention is illustrated in the accompanying drawing, in which Fig. 1 is a front elevational view showing the relation of the template mount to a commercial type tracing and cutting machine.

Fig. 2 is an enlarged side elevational view of the template mount taken along the line 2—2 of Fig. 1.

Fig. 3 is a cross sectional view taken along the line 3—3 of Fig. 2.

Figure 4:
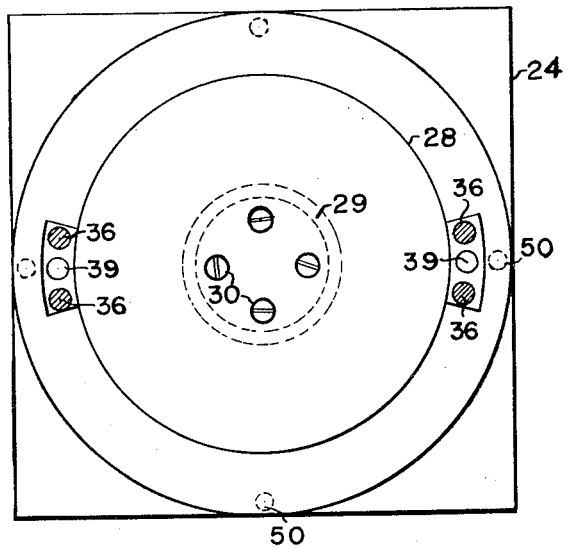
Fig. 4 is a cross sectional view taken along the line 4—4 of Fig. 3.

Referring to Fig. 1 the template 10 is mounted on the template mount indicated generally at 11. Said mount is attached by the screw clamps 12 to the conventional tracing table 13. The rotatable tracing pin 14 is magnetized by an electro-magnetic coil contained inside the housing 15, and is carried by the tracing bar 16, movably mounted in conventional manner on the base 21. An electric motor 17 rotates the shaft 18, which in turn rotates the tracing rotor or pin 14, so that this rotor or pin 14 when magnetized will adhere to the inside edge 19 of the metal template 10, and due to the rotation of the tracing rotor or pin, will creep along said edge 19 thereby communicating corresponding motion to the tracing bar 16, and in turn to the cutting torches indicated generally at 20, and which are carried by the bar 16 in conventional manner. The cutting torches 20 will then cut out the desired shapes from the metal sheet 22, which is supported by the burning table 23. The template mount 11 has a base plate 24, one side of which is turned down and inward to form a channel which fits over the edge of the table top 25 of the tracing table 13. The bottom side 26 of said channel is bored and threaded as at 27 for engaging the clamp screw 12, for firmly securing the template mount 11 to the table top 25.

The circular top or cap plate 28, spaced from the base plate 24 by the pivot bearing 29, is bolted to the base plate 24 by the bolts 30. Shims 31 are provided on the top and bottom of the pivot bearing 29 for taking up wear and are lubricated through the oil hole 32. A swivel plate 33 is mounted between the plates 24 and 28, and is thereby retained from vertical movement and from horizontal movement by the pivot bearing 29.

The template mounting bar 34, spaced from the swivel plate 33 by the spacers 35, is attached to the swivel plate 33 by the bolts 36. The template 10 is bolted to the template mounting bar 34 by the bolts 37 and elevated from it by the spacer blocks 38. A series of threaded holes 39 are provided in the template mounting bar 34 to permit the mounting of different size templates.

The lock pin 40, having the head 41, and the tapered end 42, is carried by the lever arm 43, pivoted at 44 on the ear 45.

A circular sheet metal cover 46, and the felt seal 47 provides a seal and prevents infiltration into the inner parts of the assembly.

The inner moving parts of the assembly are lubricated through the oil hole 32, and by removing the bolts 36 to permit the passage of oil to the bearing surface of the base plate 24.

Figure 5:
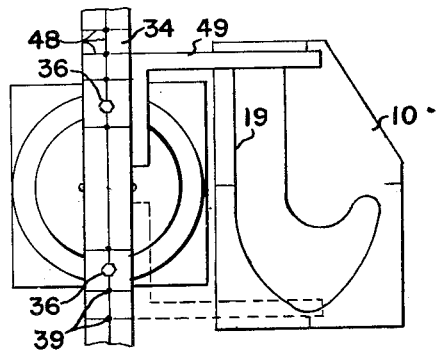
Fig. 5 is a top plan view showing the manner in which mounting holes are located in the template.
Figure 6:
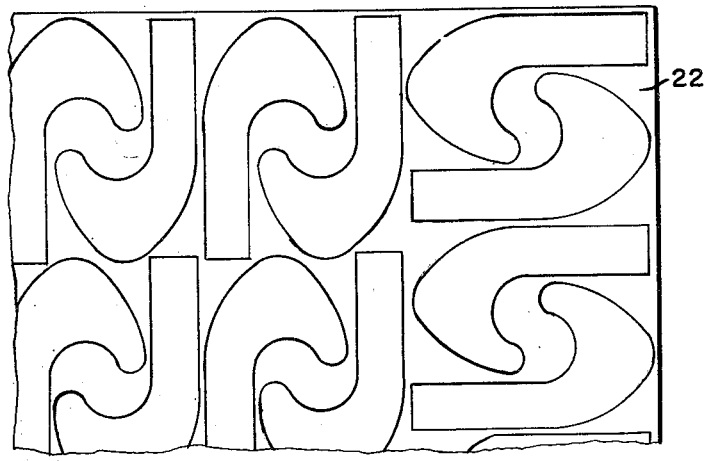
Fig. 6 is a top plan fragmentary view of a sheet of metal illustrating the manner in which interlaced shapes may be cut out from a single sheet of metal.

In operation, mounting holes are located in the ends of the template 10 by aligning the suitable engraved lines 48 on the template mounting bar 34 with the ends of the template 10, using the square 49, as shown in Figure 5. After the mounting holes are drilled in the template they are aligned with the suitable threaded holes 39 in the template mounting bar 34, said threaded holes 39 being centered on the engraved lines 48. The bolts 37 fasten the template 10 to the template mounting bar 34, being spaced from it by the spacers 38. The position of the template may be changed by pulling the lever arm 43 upward so as to release the lock pin 40 from the hole 50, which is one of a plurality of such holes located in spaced relation along the periphery of the revolving plate 33. The revolving plate is then free to rotate and the template 10 may be revolved to a new position and again securely locked in place by the engagement of the lock pin 40 with the suitable hole 50.

I claim:

1. A template mount of the character described comprising, a base plate having means for attachment to a table or other support, a pivot bearing secured to said plate, a swivel-plate supported on said base plate and rotatable on said pivot bearing, a template-mounting bar attached to said swivel plate to overlie the same, spacer means for mounting a template on said bar in spaced relation thereto, a locking member on said base plate, and a plurality of complementary locking elements on said swivel plate engageable by said member to lock said swivel plate in different positions.

2. A template mount of the character described comprising, a base plate having means for attachment to a table or other support, a pivot bearing secured to said base plate, a swivel plate supported on said base plate and rotatable on said pivot bearing, a cap-plate overlying said swivel plate and secured to said pivot bearing and said base plate to overlie the same, a template-mounting bar attached to said swivel plate, spacer means for mounting a template on said bar in spaced relation thereto, a locking member on said base plate, and a plurality of complementary locking elements on said swivel plate engageable by said member to lock said swivel plate in different positions.

3. A template mount as claimed in claim 1 in which the mounting bar is formed with graduations equally spaced in opposite directions from its center of rotation on said pivot bearing and with mounting holes for the template each centered on one of said graduations.

4. In combination with a cutting machine having a plurality of movable cutting torches and a tracing element engageable with a template and controlling the movement of said cutting torches, a template mount comprising, a base, a swivel plate pivoted on said base, template-mounting means on said plate whereby the mounted template is centered with reference to said pivot, and locking means operable to lock said plate with the template in any of a plurality of angular positions about the center of said pivot.

References Cited in the file of this patent

UNITED STATES PATENTS

| | | |
|---|---|---|
| 1,768,857 | Orzel | July 1, 1930 |
| 2,693,737 | Smith | Nov. 9, 1954 |